J. E. WHITING.
Saw-Set.

No. 165,464.

Patented July 13, 1875.

Witnesses:

Inventor:

UNITED STATES PATENT OFFICE.

JOSEPH E. WHITING, OF HARFORD, PENNSYLVANIA.

IMPROVEMENT IN SAW-SETS.

Specification forming part of Letters Patent No. 165,464, dated July 13, 1875; application filed December 4, 1874.

*To all whom it may concern:*

Be it known that I, JOSEPH E. WHITING, of Harford, Susquehanna county, Pennsylvania, have invented certain Improvements relating to Swage-Set for Saws, of which the following is a specification:

My tool is of simple construction, but is very effective. It may be used with success on all varieties of lumbermen's crosscut-saws by being applied successively upon the teeth and struck one or more light blows while on each.

The following is a description of what I consider the best means of carrying out the invention.

The accompanying drawings form a part of this specification.

Figure 2:
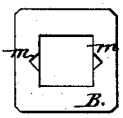
Figure 1:
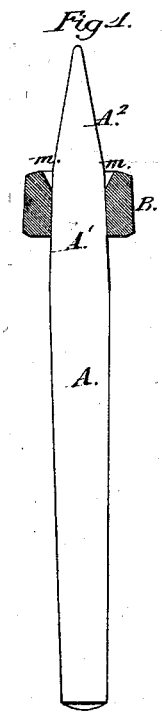

Figure 1 represents the device in an inverted position, the block which incloses the main body or handle being represented in section. Fig. 2 is a face view of the block detached.

Similar letters of reference indicate corresponding parts in both the figures.

A is a handle of steel or other suitable material, adapted to be held in the hand and struck on the upper end with a hammer. The other end is peculiarly beveled, as indicated by $A^1 A^2$, the latter being so much greater than the former as is required for the set of a tooth. B is a stout square ring or block of steel or other suitable material, with its interior $B'$ beveled to match to the bevel $A^1$ of the handle. These bevels must be so slight that the handle A, on being driven tightly into the block B, adheres without a necessity for confining-screws or the like, yet so that it may be removed at will. Carefully-formed notches $m$ are made in the inner faces $B'$ of the block B. Each is of a proper form to swage the point of a saw-tooth. The notch $m$ on one side is adapted to swage the teeth for saws for hard wood. The notch $m$ on the opposite side is correspondingly adapted to swage the teeth for saws for soft wood.

I have experimented with the device, producing the bevels $A^1 A^2 B'$ by ordinary tools, and producing the notches $m$ by careful filing, and then hardening the parts.

I propose in the large way to shape all the parts by dies, and to dress the notches $m$ by milling-tools or analogous means which operate with mathematical exactness.

In using the tool, the bevel $A^2$ is laid against the side of the tooth, the adjacent notch $m$ matched on the point of the tooth, and a blow struck on the upper end of A. This shapes or swages the metal into the form of the notch $m$, and sets it in exactly the right-angular position, one face corresponding to the bevel $A^1$, with the set due to the difference of the bevels $A^1$ and $A^2$, and the other surfaces corresponding to the faces of the notch $m$. Then, skipping one tooth and applying it on the next but one, the operation is repeated. After the whole length of the saw has been thus treated, the tool is reversed in position, and the alternate teeth, which were previously omitted, are then correspondingly treated.

I can, if required, provide notches $m$ in all the four interior faces $B'$ of the block B, taking care to give the right corresponding bevels to the corresponding faces of the body or handle. I can thus make the same tool serve to give four instead of two forms to the saw-teeth, or I can make the tool last longer by providing duplicate notches for the two forms ordinarily required.

The block may be separated from the body when required, and again reapplied; yet, by reason of the delicately-determined bevel $A^1$ on the parts A and B, no confining means are required.

I mark the several faces to aid in applying the block properly.

My set is superior to any before known to me in simplicity, lightness, and portability. It is small enough to carry in the pocket, and can be used anywhere in the woods by sawing into a log or stump, holding the saw-teeth upward therein, and then using a stone or bit of wood to strike the set with.

I have experimented mainly on large crosscut-saws; but I propose to use it also on carpenters' handsaws and crosscut-saws generally. I believe it may also be applied on splitting-saws.

I am aware that sets made all in a single piece operating in this manner have been before known without recommending themselves to favor; also, that cumbrous compound constructions, having removable dies and a confining-screw, have been proposed. I do not claim either of these; but What I do claim is—

The swage-set composed of two pieces, as described, the main part having diversely-beveled surfaces $A^1$ $A^2$, and the additional and inclosing part being beveled to correspond with the bevel $A^1$, and provided with notches $m\ m$, all adapted to serve as and for the purposes herein specified.

In testimony whereof I have hereunto set my hand this 30th day of October, 1874, in the presence of two subscribing witnesses.

JOSEPH E. WHITING.

Witnesses:
 FRED. A. OSBORN,
 J. A. WILLIAMS.